(12) United States Patent
Xiao

(10) Patent No.: US 7,839,090 B2
(45) Date of Patent: Nov. 23, 2010

(54) DRIVE CIRCUIT FOR DRIVING INDICATORS IN COMPUTER SYSTEM

(75) Inventor: Zong-Bao Xiao, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 441 days.

(21) Appl. No.: 12/116,213

(22) Filed: May 7, 2008

(65) Prior Publication Data

US 2009/0236996 A1 Sep. 24, 2009

(30) Foreign Application Priority Data

Mar. 24, 2008 (CN) .................... 2008 2 0300419 U

(51) Int. Cl.
*H01J 1/60* (2006.01)
(52) U.S. Cl. .................... 315/129; 315/133; 315/196; 315/313; 340/691.1; 340/815.4
(58) Field of Classification Search ......... 315/129–136, 315/196–197, 209 R, 291, 313; 340/691.1, 340/691.6, 815.4, 815.45
See application file for complete search history.

(56) References Cited

U.S. PATENT DOCUMENTS

| 4,195,281 | A | * | 3/1980 | Bell | ........................... 340/458 |
| 6,246,186 | B1 | * | 6/2001 | Nieberger | .................... 315/291 |
| 6,559,606 | B1 | | 5/2003 | Chou et al. | |
| 7,414,540 | B2 | * | 8/2008 | You et al. | .............. 340/815.45 |
| 2006/0097658 | A1 | * | 5/2006 | Chiang et al. | ................ 315/291 |
| 2006/0138967 | A1 | * | 6/2006 | Zhou et al. | ................... 315/129 |

* cited by examiner

*Primary Examiner*—Douglas W Owens
*Assistant Examiner*—Tung X Le
(74) *Attorney, Agent, or Firm*—Frank R. Niranjan

(57) ABSTRACT

A circuit is used to indicate different statuses of a component of a computer system. The circuit includes a port, an indicating device, and a control circuit. The port outputs different signals corresponding to different statuses of the component. The indicating device includes a first indicator and a second indicator each of which includes a positive end and a negative end. The positive end of the second indicator is connected to the negative end of the first indicator, and the negative end of the second indicator is connected to the positive end of the first indicator. The control circuit includes an input terminal, and a pair of output terminals connected to opposite ends of the first indicator. A polarity of an electric potential difference between the pair of output terminals is switched between negative and positive polarities according to the signal outputted by the port.

13 Claims, 2 Drawing Sheets

DRIVE CIRCUIT FOR DRIVING INDICATORS IN COMPUTER SYSTEM

BACKGROUND

1. Technical Field

The present invention relates to a drive circuit, and particularly to a drive circuit which drives indicators to indicate different statuses of a component in a computer system.

2. Description of Related Art

A computer system is composed of hardware and software. The hardware includes a motherboard, an optical disk drive, a hard disk drive, memory, a network card, and so on. When the computer system is running, it is necessary to know working statuses of the hardware. So indicators, such as LEDs (light-emitting diodes), are used to show the working statues of these components, and corresponding drive circuits for driving these indicators are combined in the computer system.

However, some drive circuits are so simple that only limited number of statuses of the component can be shown. For example, the indicator is lit to indicate component is currently operating, and the indicator is dark to indicate the component is idle. However, there may be other statuses of the component that would be useful to know. For example, a hard disk drive may be in a locked status to prevent reading and/or writing operations. Because the locked status of the hard disk drive cannot be shown with the given simple indicator, it is uncertain that whether the hard disk drive is locked or broken down.

What is needed is a better way to indicate the working statuses of the components in a computer system.

SUMMARY

A circuit is used to indicate different statuses of a component of a computer system. The circuit includes a port, an indicating device, and a control circuit. The port outputs different signals corresponding to different statuses of the component. The indicating device includes a first indicator and a second indicator each of which comprises a positive end and a negative end. The positive end of the second indicator is connected to the negative end of the first indicator, and the negative end of the second indicator is connected to the positive end of the first indicator. The control circuit includes an input terminal, and a pair of output terminals connected to opposite ends of the first indicator respectively. Polarity of electric potential difference between the pair of output terminals is switched between negative and positive according to the signal outputted by the port.

Other advantages and novel features of the present invention will become more apparent from the following detailed description of preferred embodiment when taken in conjunction with the accompanying drawings, in which:

DETAILED DESCRIPTION OF THE EMBODIMENT

Figure 1:
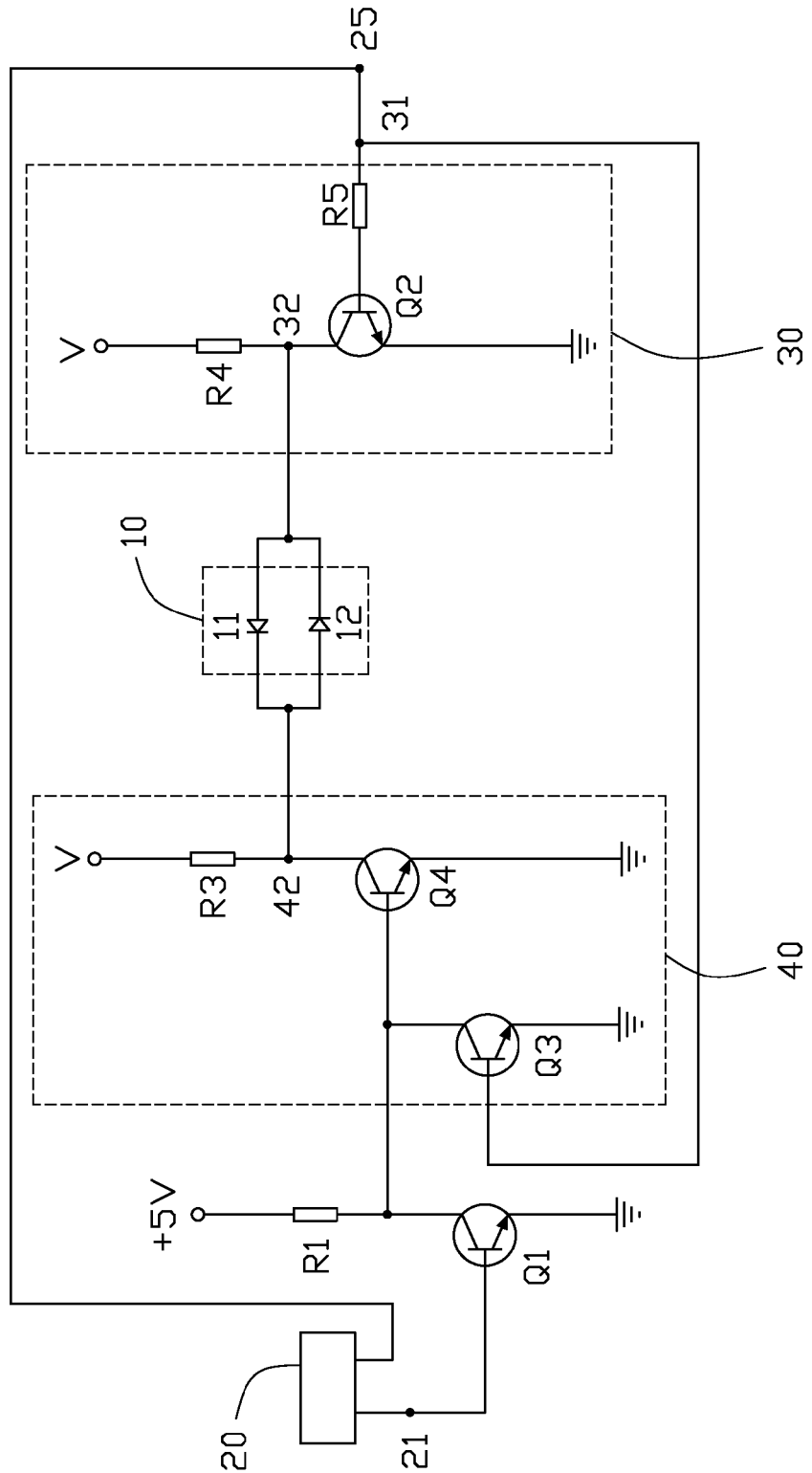
FIG. 1 is a diagram of a driving circuit for driving indicators in accordance with a preferred embodiment of the present invention.

Referring to FIG. 1, a circuit in accordance with an exemplary embodiment of the present invention is shown for driving indicators which are used to indicate different working statuses of a component, such as a hard disk drive (not shown), in a computer system. The circuit includes an indicating device 10, a first control circuit 30, a second control circuit 40, a control chipset 20, and a first transistor Q1.

The control chipset 20 is used to monitor the statuses of the hard disk drive. For example, when the connection between the hard disk drive and the computer system is satisfactory, and the hard disk drive is ready for reading or writing data, a pin 21 of the control chipset 20 will output a low level voltage signal to indicate the hard disk drive is ready. When the connection between the hard disk drive and the computer system is unsatisfactory, the pin 21 will output a high level voltage signal. The control chipset 20 further includes a GPIO (general purpose input output) port 25. An output of the GPIO port 25 is controlled by the control chipset 20. When the control chipset 20 senses the hard disk drive is locked, the GPIO port 25 outputs a high level voltage signal. When the control chipset 20 senses the hard disk drive is not locked, the GPIO port 25 outputs a low level voltage signal. In the computer system, a south bridge chipset can serve as the control chipset 20.

The indicating device 10 includes a first indicator 11 and a second indicator 12. The first indicator 11 has a positive and negative end called the first positive end and the first negative end. The second indicator 12 has a positive and negative end called the second positive end and the second negative end. Electrical current flows from the positive end to the negative end to light the indicators. In the present embodiment, the indicators 11 and 12 are LEDs. The first positive end of the first indicator 11 is connected to the second negative end of the second indicator 12, and the first negative end of the first indicator 11 is connected to second the positive end of the second indicator 12.

The first control circuit 30 includes an first input terminal 31 and an first output terminal 32. The first input terminal 31 is connected to the GPIO port 25, and the first output terminal 32 is connected to the first positive end of the first indicator 11. The first control circuit 30 further includes a second transistor Q2. The collector of the second transistor Q2 is connected to the first output terminal 32, and further connected to a power source V via a resistor R4. The base of the second transistor Q2 is connected to the first input terminal 31 via a resistor R5. The emitter of the second transistor Q2 is connected to ground.

The second control circuit 40 includes an second input terminal connected to CPIO port 25, and an second output terminal 42. The second output terminal 42 is connected to the first negative end of the first indicator 11. The second control circuit 40 further includes a third transistor Q3 and a fourth transistor Q4. The collector of the fourth transistor Q4 is connected to the second output terminal 42, and further connected to the power source V via a resistor R3. The base of the fourth transistor Q4 is connected to the power source V via a resistor R1. The emitter of the fourth transistor Q4 is connected to ground. The collector of the third transistor Q3 is connected to the base the fourth transistor Q4. The base of the third transistor Q3 is connected to the GPIO port 25. The emitter of the third transistor Q3 is connected to ground.

Figure 2:
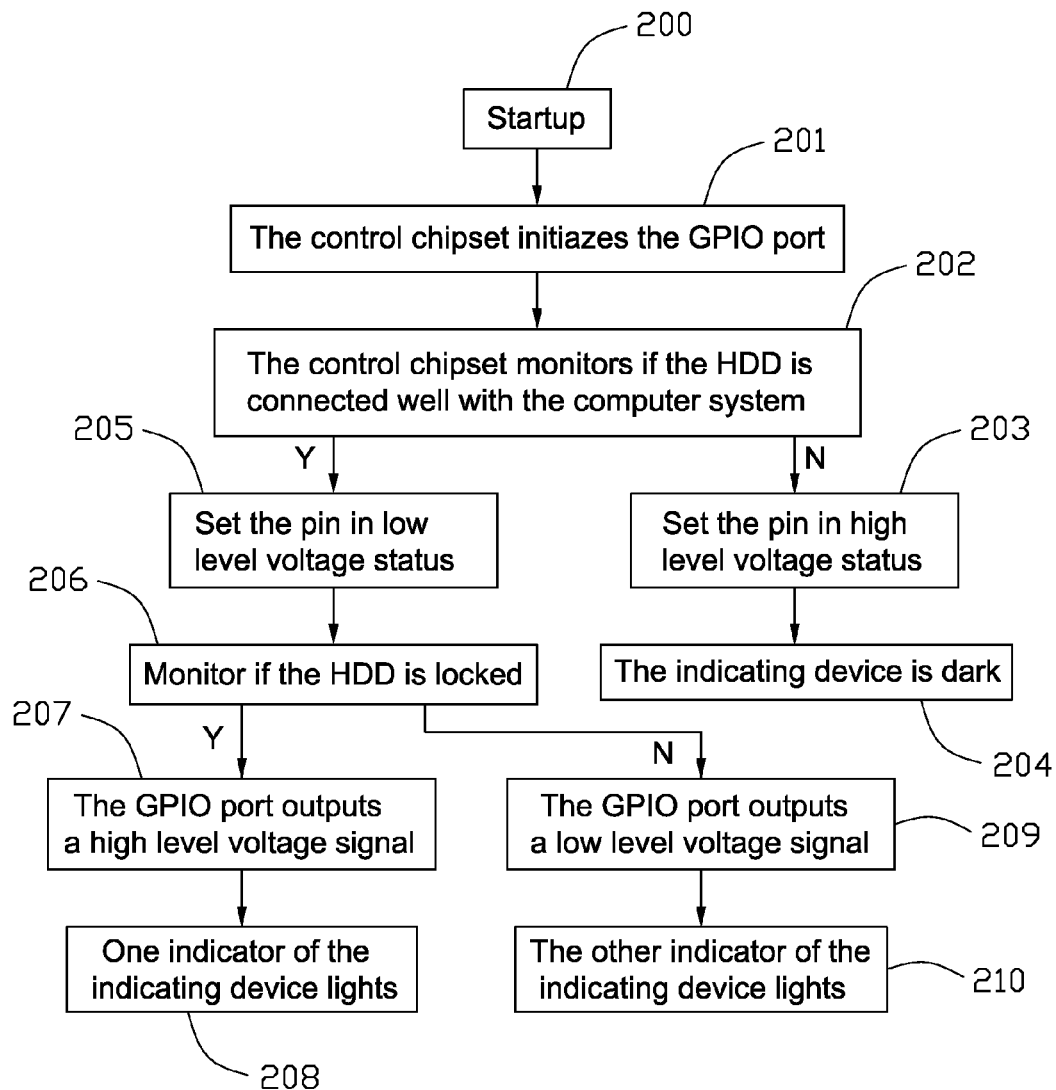
FIG. 2 is a flow chart showing the driving circuit driving the indicators of FIG. 1.

Referring to FIG. 2, the working flow chart is described below. After the computer system is started up (step 200), the control chipset 20 initializes the GPIO port 25 with a low level voltage (step 201). Then, the control chipset 20 monitors the connection between the hard disk drive and the computer system (step 202). If the connection between the hard disk drive and the computer system is unsatisfactory, voltage at the pin 21 of the control chipset 20 is set high (step 203). In this situation, the first transistor Q1 conducts, and the base of the fourth transistor Q4 connects to ground via the first transistor Q1. The fourth transistor Q4 is off, and the second output terminal 42 outputs a high level voltage signal. The second transistor Q2 is also off because of the low level voltage signal output from the GPIO port 50. The first output terminal 32 outputs a high level voltage signal. Because voltage at both ends of each of the indicators 11 and 12 is high, both of the indicators 11, 12 are not lit (step 204).

If the connection between the hard disk drive and the computer system is satisfactory, voltage at the pin 21 of the control chipset 20 is set low (step 205). Then, the control chipset 20 monitors if the hard disk drive is locked (step 206). If the hard disk drive is locked, the control chipset 20 controls the GPIO port 25 to output a high level voltage signal (207). The second transistor Q2 and the third transistor Q3 are turned and conduct. The first output terminal 32 connects to ground via the second transistor Q2. The base of the fourth transistor Q4 connects to ground via the third transistor Q3, and the fourth transistor Q4 is off. The second output terminal 42 outputs a high level voltage signal. Then, the second indicator 12 lights up, and the first indicator 11 remains off (step 208).

If the hard disk drive is not locked, the control chipset 20 controls the GPIO port 25 to output a low level voltage signal (step 209). The second transistor Q2 is off, and the first output terminal 32 outputs a high level voltage signal. Voltage at the base of the fourth transistor Q4 is high, turning on the fourth transistor Q4. The second output terminal 42 connects to ground via the fourth transistor Q4. Then, the first indicator 11 lights up, and the second indicator 12 is unlit (step 210).

Thus the present embodiment of the invention will indicate three status situations. In the first situation, the connection between the hard disk drive and the computer system is unsatisfactory, and both of the indicators 11, 12 are not lit. In the second situation, the connection to hard drive disk is satisfactory but the hard disk drive is locked, the second indicator 12 lights up and the first indicator 11 is not lit. In the third situation, the connection to the hard disk drive is satisfactory and the hard drive is not locked, the second indicator 12 is off, and the first indicator 11 lights up. Different combinations of what indicators are lit and not lit can be applied to this invention.

For other components in the computer system, such as network card, optical disk drive and so on, the above described drive circuit also can be used to indicate their different statuses.

It is to be understood, even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A circuit for indicating status of a component of a computer system, the circuit comprising:
    a first indicator comprising a first positive end and a first negative end;
    a second indicator comprising a second positive end connected with the first negative end, and a second negative end connected with the first positive end;
    a first control circuit comprising a first input terminal and a first output terminal, the first control circuit configured in such a manner that:
        on the condition that a high level voltage signal is inputted in the first input terminal, the first output terminal outputs a low level voltage signal, and on the condition that a low level voltage signal is inputted in the first input terminal, the first output terminal outputs a high level voltage signal;
    the first output terminal connected to the first positive end, the first input terminal connected to a port which is capable of outputting different signals corresponding to different statuses of the component; and
    a second control circuit comprising a second input terminal and a second output terminal;
    the second control circuit configured in such a manner that:
        on the condition that an high level voltage signal is inputted in the second input terminal, the second output terminal outputs a high level voltage signal, and on the condition that a low level voltage signal is inputted in the second input terminal, the second output terminal outputs a low level voltage signal; and
    wherein the second output terminal is connected to the first negative end of the first indicator, the second input terminal is connected to the port.

2. The circuit as described in claim 1, wherein the first control circuit further comprises a second transistor, a collector of the second transistor is connected to the first output terminal, and further connected to a power source via a resistor, a base of the second transistor is connected to the first input terminal, and an emitter of the second transistor is connected to ground.

3. The circuit as described in claim 1, further comprises a control chipset monitoring the statuses of the component; wherein the port is connected to the control chipset and is controlled by the control chipset.

4. The circuit as described in claim 3, wherein the control chipset monitors the component; upon the condition that the component is locked, the control chipset controls the port output a first signal, and upon the condition that the component is not locked, the control chipset controls the port outputs a second signal which has an polarity that is the reverse of the first signal.

5. The circuit as described in claim 3, further comprises:
    a first transistor, wherein a collector of the first transistor is connected to the second control circuit, and an emitter of the first transistor is connected to ground;
    the control chipset monitors if there is a satisfactory connection between the component and the computer system, and outputs corresponding signals to the base of the first transistor.

6. The circuit as described in claim 5, wherein the second control circuit comprises a third transistor and a fourth transistor;
    a collector of the fourth transistor is connected to the output terminal of the second control circuit, and further connected to a power source via a resistor;
    a base of the fourth transistor is connected to the power source via a resistor, and an emitter of the fourth transistor is connected to ground;
    a collector of the third transistor is connected to the base the fourth transistor, a base of the third transistor is connected to the second input terminal, and an emitter of the third transistor is connected to the ground; and
    the collector of the first transistor is connected to the base of the fourth transistor.

7. A circuit for indicating different status of a component of a computer system, the circuit comprising:
    a port which outputs different signals corresponding to different statuses of the component;

an indicating device comprising a first indicator and a second indicator, the first indicator comprising a first positive end and a first negative end, the second indicator comprising a second positive end and a second negative end, the second positive end connected to the first negative end, the second negative end connected to the first positive end; and a control circuit comprising an input terminal, and a pair of output terminals connected to opposite ends of the first indicator, wherein polarity of electric potential difference between the pair of output terminals is switched between negative and positive polarities according to the signal outputted by the port.

8. The circuit as described in claim 7, wherein the control circuit comprises a first control circuit and a second control circuit, the first control circuit comprises a first output terminal which is one of the pair of output terminals, the first output terminal is connected to the first positive end, the second control circuit comprises a second output terminal which is the other one of the pair of output terminals, the second output terminal is connected to the first negative end.

9. The circuit as described in claim 8, wherein the first control circuit comprises a second transistor, a collector of the second transistor is connected to the first output terminal, and further connected to a power source via a resistor, a base of the second transistor is connected to the input terminal, and an emitter of the second transistor is connected to ground.

10. The circuit as described in claim 8, further comprises a control chipset that monitors the statuses of the component, wherein the port is connected to the control chipset and is controlled by the control chipset.

11. The circuit as described in claim 10, wherein the control chipset monitors the component, upon the condition that the component is locked, the control chipset controls the port outputting a first signal, and upon the condition that the component is not locked, the control chipset controls the port outputting a second signal that has polarity opposite to the first signal.

12. The circuit as described in claim 11, further comprises a first transistor, a collector of the first transistor is connected to the second control circuit, and an emitter of the first transistor is connected to ground;

the control chipset monitors if there is a satisfactory connection between the component and the computer system, and outputs corresponding signals to the base of the first transistor.

13. The circuit as described in claim 12, wherein the second control circuit comprises a third transistor and a fourth transistor, a collector of the fourth transistor is connected to the second output terminal and further connected to a power source via a resistor, a base of the fourth transistor is connected to the power source via a resistor, an emitter of the fourth transistor is connected to ground;

a collector of the third transistor is connected to the base the fourth transistor, a base of the third transistor is connected to the input terminal, and an emitter of the third transistor is connected to the ground; and the collector of the first transistor is connected to the base of the fourth transistor.

* * * * *